United States Patent
Wakao et al.

(10) Patent No.: US 8,493,200 B2
(45) Date of Patent: Jul. 23, 2013

(54) APPARATUS FOR ESTIMATING TIRE WEAR AMOUNT AND A VEHICLE ON WHICH THE APPARATUS FOR ESTIMATING TIRE WEAR IS MOUNTED

(75) Inventors: Yasumichi Wakao, Tokyo (JP); Yasushi Hanatsuka, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 566 days.

(21) Appl. No.: 12/519,067

(22) PCT Filed: Nov. 21, 2007

(86) PCT No.: PCT/JP2007/072508
§ 371 (c)(1),
(2), (4) Date: Jul. 6, 2009

(87) PCT Pub. No.: WO2008/072453
PCT Pub. Date: Jun. 19, 2008

(65) Prior Publication Data
US 2010/0060443 A1    Mar. 11, 2010

(30) Foreign Application Priority Data

Dec. 13, 2006  (JP) .................................. 2006-335883
Dec. 13, 2006  (JP) .................................. 2006-335893

(51) Int. Cl.
*B60C 23/00* (2006.01)

(52) U.S. Cl.
USPC .................... 340/442; 340/438; 340/425.5

(58) Field of Classification Search
None
See application file for complete search history.

(56) References Cited

U.S. PATENT DOCUMENTS

| | | | | |
|---|---|---|---|---|
| 5,731,754 A * | 3/1998 | Lee et al. | ...................... | 340/447 |
| 5,847,645 A * | 12/1998 | Boesch | ...................... | 340/442 |
| 5,964,509 A * | 10/1999 | Naito et al. | ................... | 303/112 |
| 6,313,742 B1 * | 11/2001 | Larson | .......................... | 340/442 |
| 6,759,952 B2 * | 7/2004 | Dunbridge et al. | ........... | 340/444 |
| 7,443,288 B2 * | 10/2008 | Dunbridge et al. | ........... | 340/444 |
| 2003/0006893 A1 * | 1/2003 | Dunbridge et al. | ........... | 340/444 |

FOREIGN PATENT DOCUMENTS

| | | |
|---|---|---|
| DE | 10306498 A1 | 8/2004 |
| GB | 2326007 A | 12/1998 |
| JP | 06-313749 A | 11/1994 |
| JP | 07-164830 A | 6/1995 |
| JP | 2002002240 A | 1/2002 |
| JP | 2002-362117 A | 12/2002 |
| JP | 2003-146037 A | 5/2003 |

(Continued)

OTHER PUBLICATIONS

Extended European Search Report corresponding to EP 07832238 dated Dec. 1, 2009.

*Primary Examiner* — Travis Hunnings
(74) *Attorney, Agent, or Firm* — Sughrue Mion, PLLC

(57) ABSTRACT

A vehicle velocity detector 15 is provided, velocity V is detected from position data of the vehicle calculated by using signal from satellites, which is received by a GPS receiver 11 installed to a vehicle body, wheel rotation velocity $V_{w0}$ detected by a wheel velocity sensor 12 is corrected in accordance with tire inner pressure detected by a pressure sensor 13 so as to obtain wheel rotation velocity (correction value) $V_w$, velocity ratio $R=(V_w/V)$, which is ratio of the corrected wheel rotation velocity $V_w$ and the detected wheel velocity V, is calculated and tire wear amount is estimated in accordance with velocity ratio R so that tire wear amount can be measured precisely without processing the tire tread portion.

9 Claims, 6 Drawing Sheets

FOREIGN PATENT DOCUMENTS

| | | |
|---|---|---|
| JP | 2003-172616 A | 6/2003 |
| JP | 2005-028950 A | 2/2005 |
| JP | 2005-186739 A | 7/2005 |
| JP | 2005-201723 A | 7/2005 |
| JP | 2006-162384 A | 6/2006 |
| JP | 2007-153034 A | 6/2007 |

* cited by examiner

APPARATUS FOR ESTIMATING TIRE WEAR AMOUNT AND A VEHICLE ON WHICH THE APPARATUS FOR ESTIMATING TIRE WEAR IS MOUNTED

CROSS REFERENCE TO RELATED APPLICATIONS

This application is a National Stage of International Application No. PCT/JP2007/072508 filed Nov. 21, 2007, claiming priority based on Japanese Patent Application Nos. 2006-335893 and 2006-335883 both filed Dec. 13, 2006, the contents of all of which are incorporated herein by reference in their entirety.

FIELD OF THE INVENTION

The present invention relates to an apparatus for estimating wear amount on a tire tread portion.

BACKGROUND OF THE INVENTION

Generally, when a tire wears off, its tire performance changes greatly, for example, drain-performance in a damp road declines in accordance with its degree of wear. Accordingly, to enhance safety of a vehicle, it is important to detect condition of the tire contacting with a road surface, particularly its degree of wear. Progress of wear of the tire causes burst of the tire.

As a method of estimating tire wear, there is proposed that a method for estimating tire wear by burying a sensor 53 including a resistance means 51 that a plurality of conductive rubber resistance 51*a* are connected to resistance 51*b* in parallel and direct power supply directly connected to the resistance means 51, and a tire mounting unit 50 including a transmitter 55 transmitting detection signal of the sensor 53 through an antenna 54 in a block 61 of a tire tread 60, detecting resistance value of the resistance means 51 that changes in accordance with wear of the block 61 and estimating wear amount of the tire tread 60 (make reference with, for example, patent document 1) as shown in the FIGS. 6(*a*) and (*b*).

Patent document 1: Patent application publication JP2005-28950

SUMMARY OF THE INVENTION

Problem to be Resolved

However, since it is required to bury the tire mounting unit 50 comprising the transmitter 55 including the antenna 54 in the block 61 of the tire tread portion 60, tire tread portion 60 must be processed.

In the view of the above problem, the present invention is made. It is object to provide an apparatus for estimating the tire wear mount, which can measure tire wear amount accurately without processing for the tire tread portion.

Means for Resolving the Problem

Generally, since a periphery of the tire decreases when tire wear progresses, rotation velocity $V_w$ of the tire increases, even if ground velocity V of the vehicle is same.

The inventors have noted such facts. And then they have studied relation between velocity ration R with respect to vehicle velocity V that is detected in accordance with data obtained from a GPS (Global Positioning System) used in a navigation system that is mounted on the vehicle in recent years and tire wear amount. From the result, the present inventor has found that tire wear amount is estimated by using velocity ration R so that tire wear amount can be estimated accurately without processing the tire tread portion, since there is great correlation between the velocity ration R and tire wear amount, and then has reached to the present invention.

Also, in the case of that tire wear progresses, even when vehicle longitudinal acceleration $a_x$ is same, wheel rotation acceleration $a_w = (dV_{w0}/dt)$, which is changing amount of wheel rotation velocity, increases. The inventors has studied relation between acceleration ratio S that is ratio of wheel rotation acceleration $a_w$ with respect to above vehicle longitudinal acceleration $a_x$ and measure of tire wear amount and then understood that acceleration ratio S has high correlation with respect to measure of tire wear amount. Therefore, instead of velocity ratio R, tire wear amount can be estimated accurately without processing the tire tread portion, even when tire wear amount is measured using acceleration ratio S.

According to a first aspect of the present invention, there is provided an apparatus for estimating tire wear amount comprising a GPS receiver installed to a vehicle, a vehicle velocity detecting unit of detecting vehicle velocity from location data of the vehicle obtained by the GPS receiver, a wheel rotation velocity measuring unit of measuring rotation velocity of a wheel of the vehicle and a wear amount estimating unit of estimating wear amount of the tire installed to the vehicle from detected vehicle velocity and rotation velocity of the wheel.

According to a second aspect of the present invention, there is provided an apparatus for estimating tire wear amount comprising a vehicle longitudinal acceleration measuring unit installed to a vehicle body side of a vehicle and measuring longitudinal acceleration of the driven vehicle, a wheel rotation velocity measuring unit of measuring rotation velocity of a wheel of the vehicle, a calculating unit of calculating changing amount of measured rotation velocity of the wheel and a wear amount estimating unit of estimating wear amount of the tire mounted on the vehicle from measured longitudinal acceleration and calculated changing amount of wheel rotation velocity.

According to a third aspect of the present invention, there is provided the apparatus for estimating tire wear amount according to claim 1 or claim 2 further comprising a detecting unit of detecting inner pressure of the tire of the vehicle and, a correcting unit of correcting measured rotation velocity of the wheel in accordance with detected inner pressure.

According to a fourth aspect of the present invention, there is provided the tire wear mount estimating apparatus according to any of claims 1 to 3 further comprising a warning unit of warning when estimated wear amount of the tire exceeds predetermined value that is set in advance.

According to a fifth aspect of the present invention, there is provided the vehicle comprising the tire wear amount estimating apparatus according to claims 1 to 4.

Effect of the Invention

According to the present invention, the apparatus for estimating tire wear estimation comprises the GPS receiver, the vehicle velocity detection unit of detecting velocity of the vehicle from position data obtained by the GPS receiver, the wheel rotation velocity measurement unit and wear amount estimation unit of measuring wear amount of the tire from detected vehicle velocity and wheel rotation velocity so that wear amount of the tire tread portion can be estimated accurately.

Also, instead of the vehicle velocity detection unit, the vehicle longitudinal acceleration measurement unit of measuring vehicle longitudinal acceleration is mounted on the vehicle side, a calculating unit of calculating changing amount of rotation velocity measured by the wheel rotation velocity measurement unit is provided and tire wear amount is estimated from vehicle longitudinal acceleration and calculated wheel rotation velocity so that wear amount of the tire tread portion can be estimated accurately.

At this point, detector of detecting inner pressure in the tire of the vehicle is provided in order to correct measured wheel rotation velocity in accordance with detected inner pressure of the tire so that wear amount of the tire tread portion can be estimated more accurately.

A warning unit of warning around when tire wear amount exceeds predetermined value set in advance is provided so that a driver can acknowledge tire condition before the tire condition becomes unsuitable.

Further, utilizing the result of the above judging, hydroplaning due to lack of groove depth is prevented so that safety can be improved.

EXPLANATION OF FIGURE

The FIG. 1 is a block diagram showing a structure of the apparatus for estimating tire wear amount according to the preferred embodiment 1.

The FIG. 2 is a diagram showing arrangement of the measurement unit used in the apparatus for estimating tire wear amount.

Figure 3:
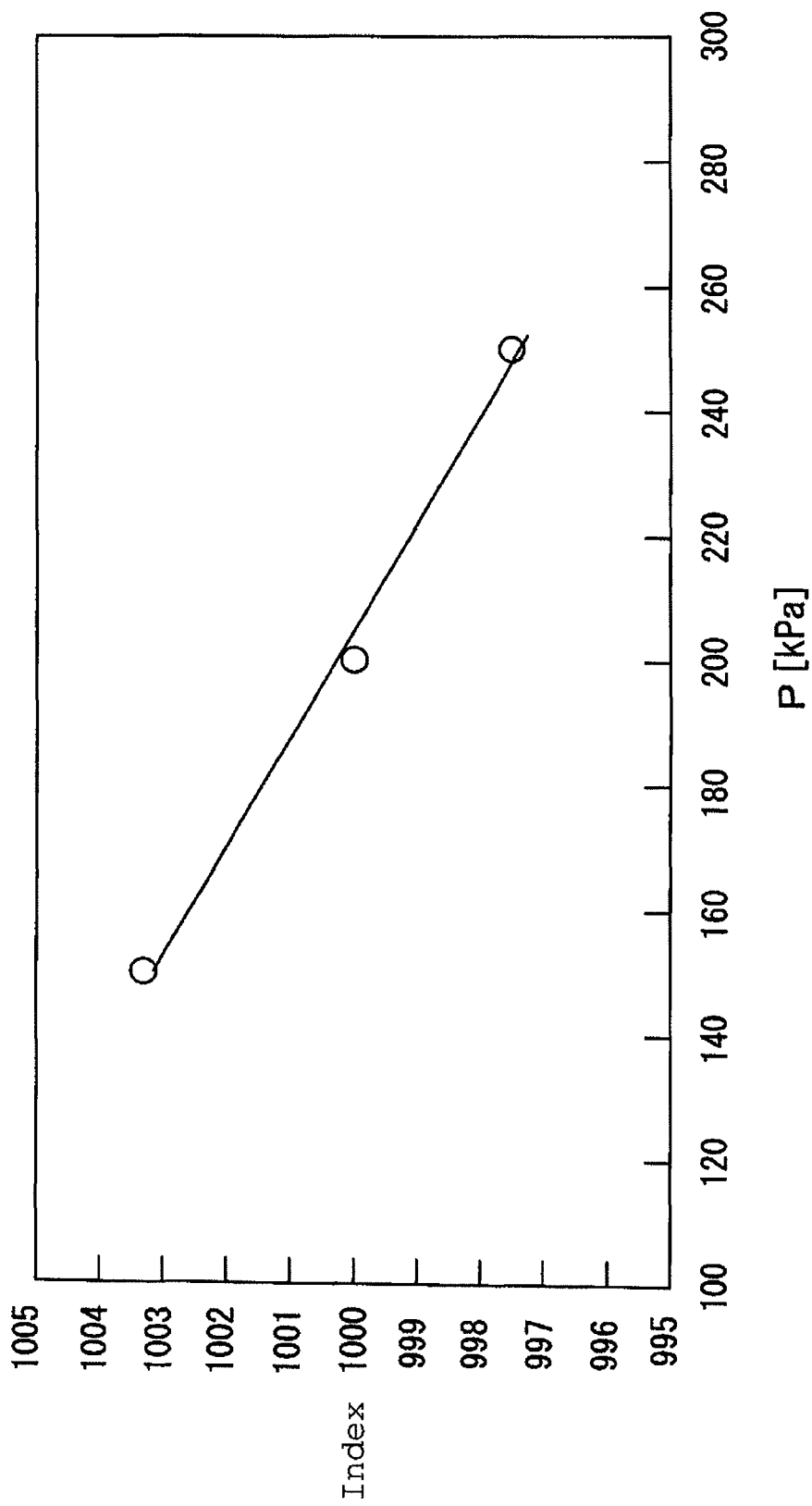

The FIG. 3 is a diagram showing relation between inner pressure in the tire and wheel rotation velocity.

Figure 4:
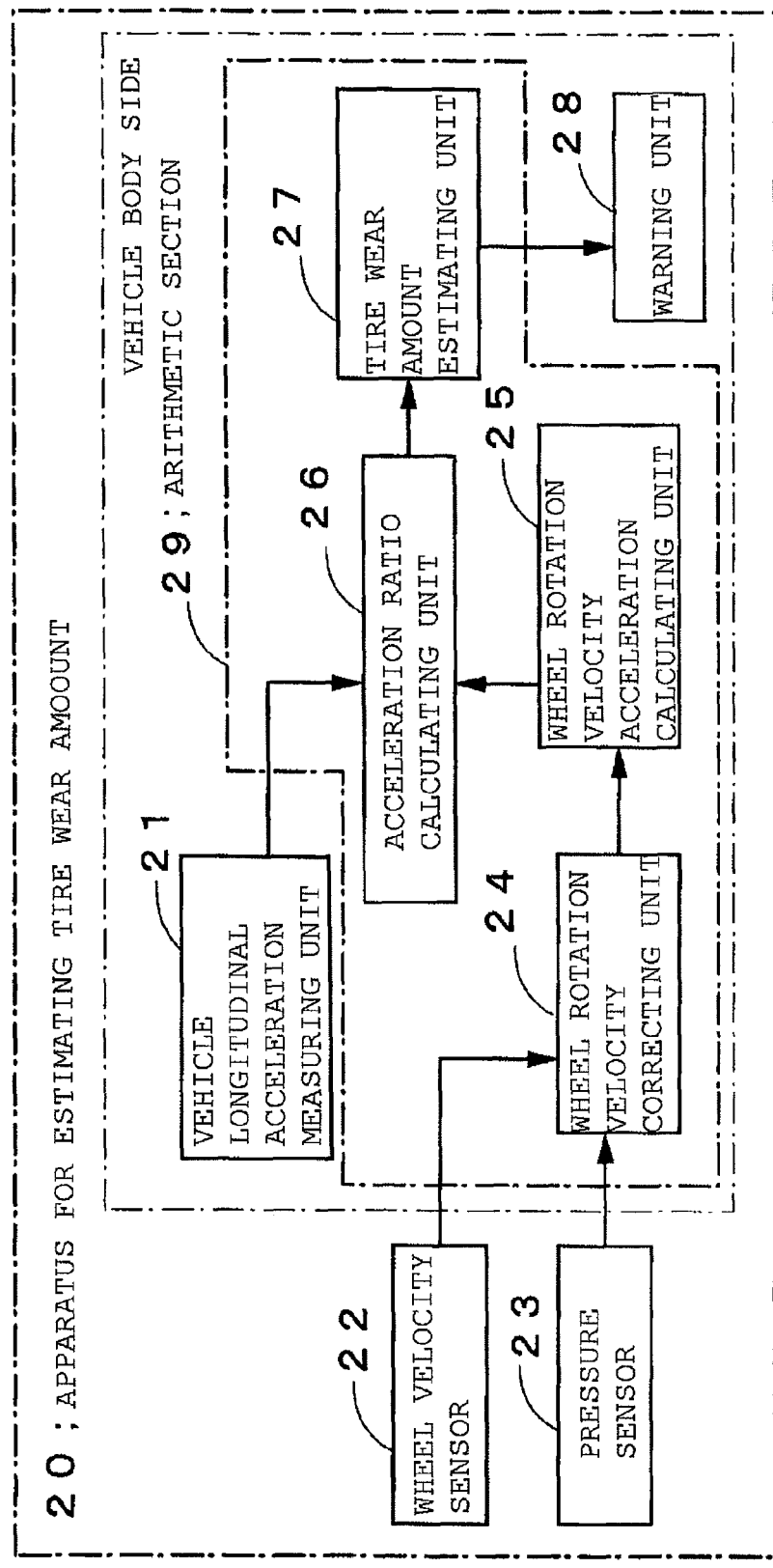

The FIG. 4 is a diagram showing a functional block diagram showing a structure of the apparatus for estimating tire wear amount according to the preferred embodiment 2.

Figure 5:
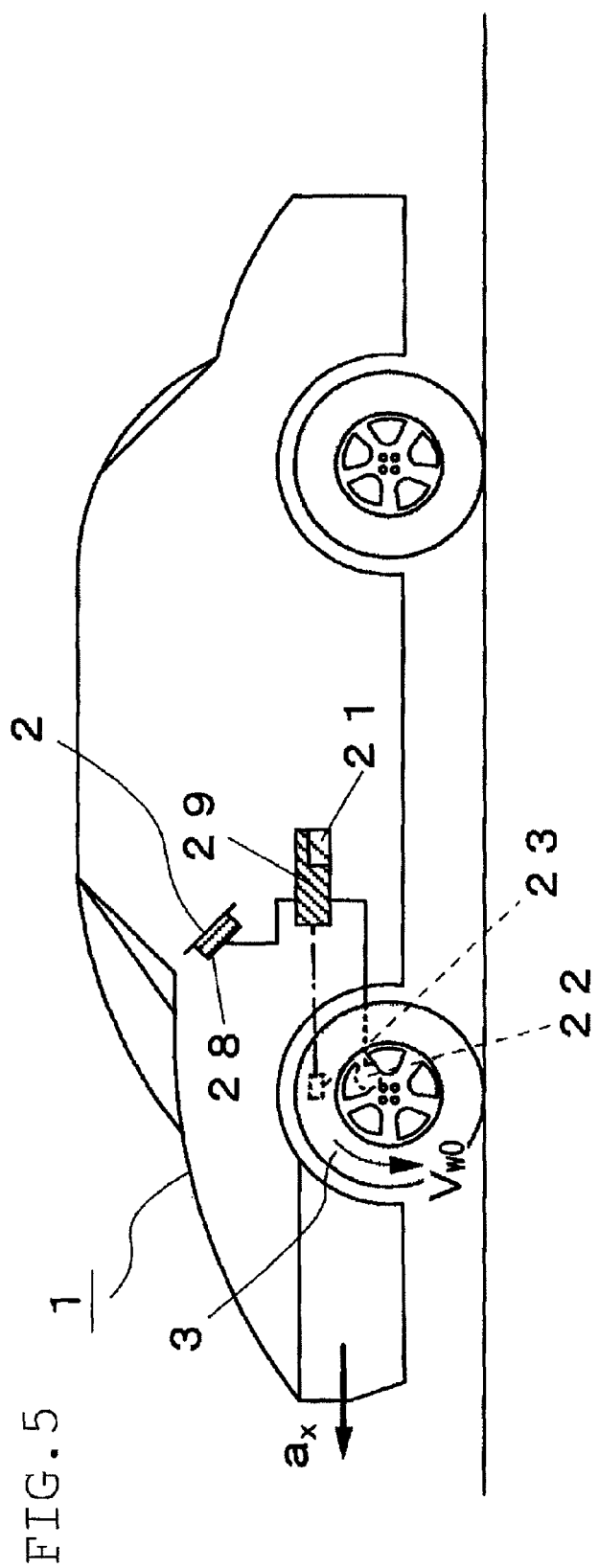

The FIG. 5 is a diagram showing the measurement unit used in the apparatus for estimating tire wear amount.

Figure 6A:
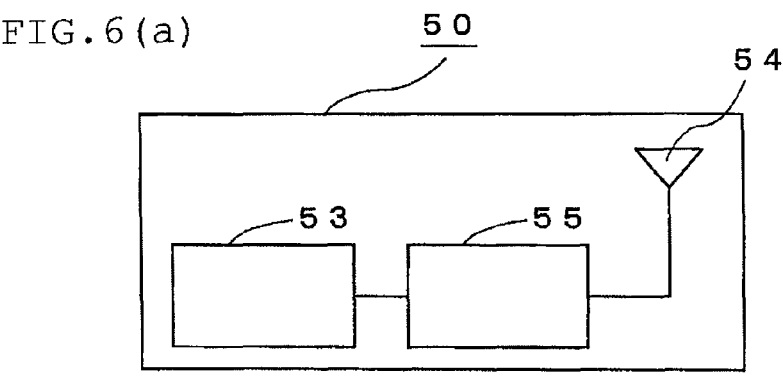
Figure 6B:
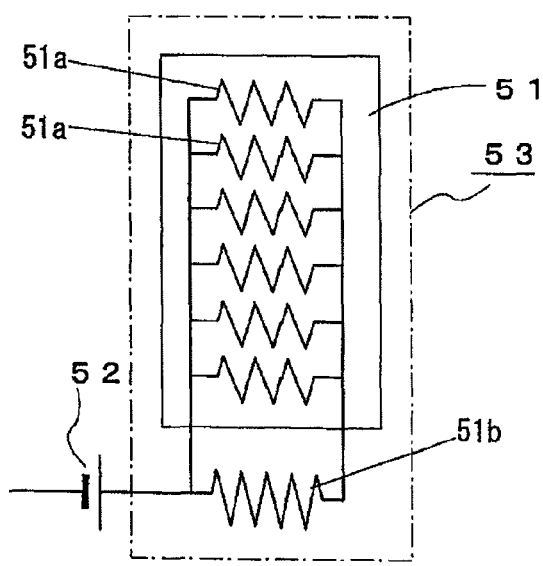
Figure 6C:
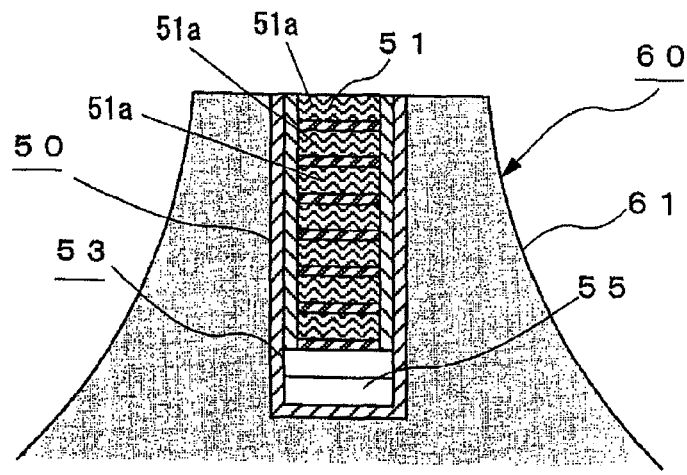

The FIG. 6 is a diagram showing a method of estimating tire wear amount.

EXPLANATION OF SYMBOL

The numeral 1 denotes a vehicle body, 2 a display panel, 3 a tire, 4 a navigation system, 10 an apparatus for estimating tire wear amount, 11 a GPS receiver, 12 a wheel velocity sensor, 13 a pressure sensor, 14 a wheel rotation velocity correction unit, 15 a vehicle velocity detection unit, 16 a velocity ratio calculating unit, 17 a tire wear amount estimation unit, 18 a warning unit, 20 an apparatus for estimating tire wear amount, 21 a vehicle longitudinal acceleration measurement unit, 22 a wheel velocity sensor, 23 a pressure sensor, 24 a wheel rotation velocity correction unit, 25 a wheel rotation velocity acceleration calculating unit, 26 an acceleration ratio calculating unit, 27 a tire wear amount estimating unit and 28 a warning unit.

the preferred embodiment will be explained as follows, with making reference to the figures.

The preferred embodiment 1.

Figure 1:
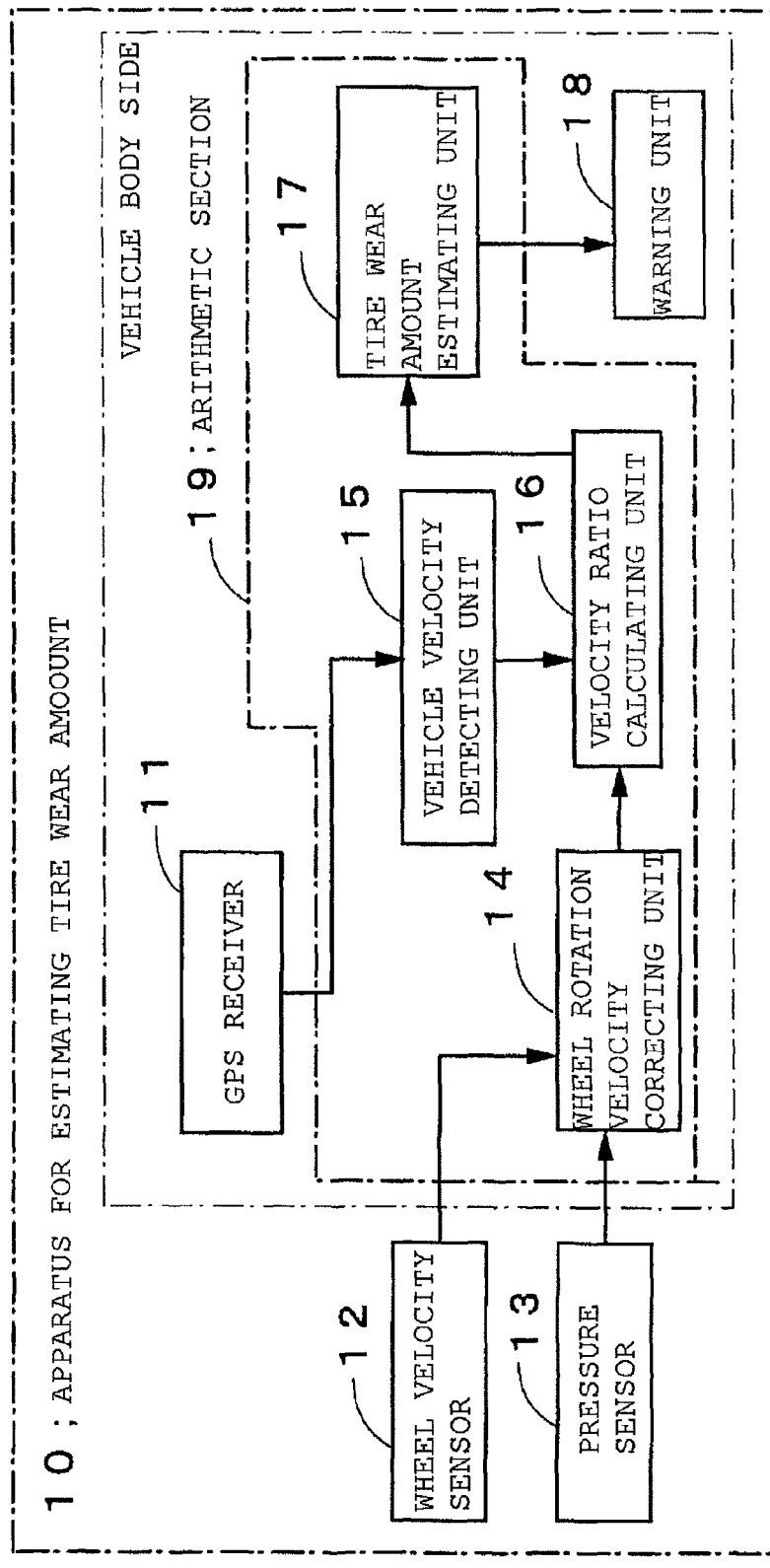
Figure 2:
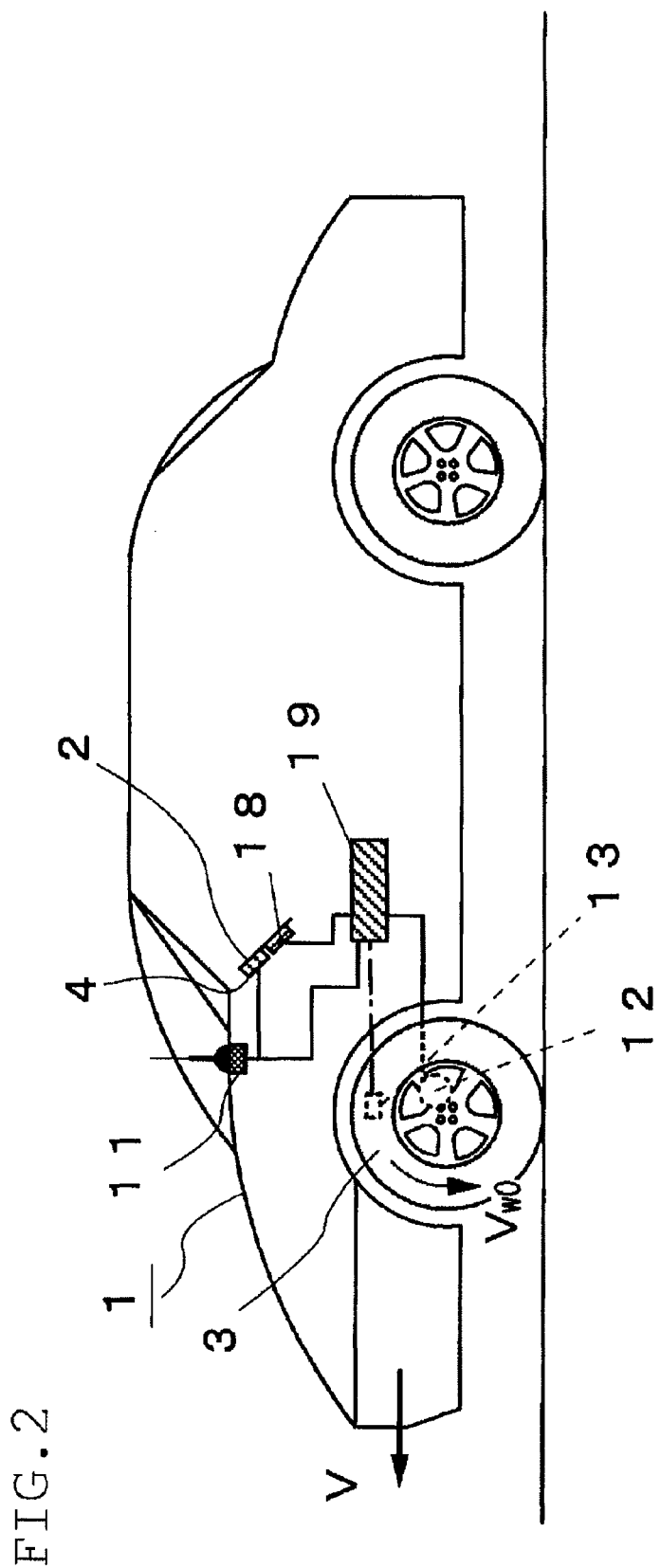

The FIG. 1 is a block diagram showing a structure of the apparatus for estimating tire wear amount. In this figure, numeral 11 denotes a GPS receiver which is mounted on vehicle side and receives signal from a plurality of satellites used in the GPS, 12 denotes a wheel velocity sensor which detects wheel rotation velocity $V_{w0}$, 13 denotes a pressure sensor which detects pressure in a interior of the tire of the vehicle (hereafter, tire inner pressure), 14 denotes a wheel rotation velocity correcting unit which corrects wheel rotation velocity $V_{w0}$ detected by the wheel velocity sensor 12 in accordance with tire inner pressure detected by the pressure sensor 13, 15 denotes a vehicle velocity detecting unit which calculates position date from signal received by the GPS receiver 11 and detects ground velocity (hereafter, vehicle velocity) V of the vehicle in accordance with the position data, 16 denotes a velocity ratio calculating unit which calculates velocity ratio $R=(V_w/V)$ that is ratio of wheel rotation velocity $V_w$ corrected in the wheel velocity correction unit 14 with respect to the vehicle velocity V detected in the vehicle velocity detection unit 15, 17 denotes a tire wear amount estimating unit which estimates wear amount of the tire from calculated ratio R and 18 denotes an warning unit which warns that wear of the tire progresses, when the estimated wear amount exceeds predetermined value. An arithmetic section 19 of the apparatus for estimating tire wear amount 10 comprises the wheel rotation velocity correcting unit 14, the vehicle velocity detecting unit 15, the velocity ration calculating unit and the tire wear amount estimating unit 17. In the present embodiment, as shown in the FIG. 2, the GPS receiver 11 and the arithmetic section 19 are disposed on the vehicle side. The warning unit 18 is installed to the display panel 2 arranged in the front of a driver's seat. The wheel velocity sensor 12 is disposed in the vicinity of a driving shaft as not shown in the figure. The pressure sensor 13 is disposed in an inner side of the wheel as not shown in the figure.

As the wheel velocity sensor 12, a closed magnetic circuit type sensor may be used. Also, other type sensor such as a bearing-integrated sensor may be used. As the pressure sensor 13, a tire pressure monitoring system (TPMS) that is installed to an interior of the tire or the wheel, since it is required to transmit data to the vehicle side.

A method of estimating tire wear amount by using the apparatus for estimating tire wear amount 10 according to the present invention. Firstly, signal received by the GPS receiver 11 from the satellites is transmitted to the vehicle velocity detection unit 15, position data is calculated and ground vehicle velocity V is detected by the vehicle velocity detection unit 15. If the navigation system 4 (make reference to the FIG. 2) is mounted, position data for detecting ground vehicle velocity V may be output to the vehicle velocity detection unit 15 from the navigation system.

Wheel rotation velocity $V_{w0}$ is measured by the wheel velocity sensor 12. In the view of that when tire inner pressure decrease, periphery of the tire tends to decrease, in the embodiment, the pressure sensor 13 is mounted on the tire 3 to detect tire inner pressure and the wheel rotation velocity correction unit 14 is provided so as to correct measured wheel rotation velocity $V_{w0}$ in accordance with detected tire inner pressure. Hereinafter, wheel rotation velocity after correction is represented as $V_w$.

Velocity ratio $R=(V_w/V)$ that is ratio of wheel rotation velocity $V_w$ with respect to vehicle velocity detected in the vehicle velocity detection unit 15 is calculated by the velocity ratio calculating unit 16.

In the tire wear amount estimating unit 17, ratio $(R/R_0)$, which is ratio of velocity ratio R with respect to velocity ratio $R_0$ when tire is new, is obtained. In accordance with value of ratio $(R/R_0)$, wear amount of the tire is estimated. When wear amount of the tire is great, velocity ratio R is great. Therefore, for example, wear amount (degree of wear) of the tire is estimated, such a manner that threshold K1 and K2, which are greater than 1, is set, where $(R/R_0)<K1$, wear amount of the tire is small, where $K1 \leq (R/R_0)<K2$, wear amount of the tire is middle degree and where $K2 \leq (R/R_0)<K1$, wear amount of the tire is great.

When the tire wear amount estimating unit 17 estimates that wear is great, signal is input to warning unit 18, a LED for warning, which is provided with the display panel 2, is blinked so as to warn drivers that wear of the tire progresses.

Since depth of groove is short in the case of that wear of the tire progresses, hydroplaning is occurred readily, even when the depth of water is shallow. The warning is used so as to inform the driver of condition of the tire before the tire is in unsuitable condition. Thereby, the driver can change the tire to enhance safety of the vehicle.

According to the embodiment 1, the vehicle velocity detection unit 15 is disposed to detect vehicle velocity V in accordance with position data of the vehicle calculated by using signal from the satellites, which is received in the GPS receiver 11 mounted on the vehicle body 1, wheel rotation velocity $V_{w0}$ is measured by the wheel velocity sensor 12 to transform it in accordance with tire inner pressure detected in the pressure sensor 13 to wheel rotation velocity $V_w$, velocity ratio $R=(V_w/V)$, which is ratio with respect to vehicle velocity V of wheel rotation velocity $V_w$ is calculated so that wear amount of the tire tread portion can be estimated accurately without processing the tire tread portion.

In the preferred embodiment 1, wear amount is classified into 3 grades, which are large, middle and small, according to degree of wear amount. However, as threshold is one, degree of wear is classified into 2 grades and timing of tire change may be informed to the driver, when degree of tire wear becomes great.

Also, degree of wear may be classified in more detail. However, since purpose for inspecting tire wear is to enhance safety of vehicle running, as the embodiment, it is more utilitarian to classify 3 grades as degree of wear.

Since change of velocity ratio $R=(V_w/V)$ due to tire wear differs in accordance with a type of the tire (difference of outer diameter), needless to say, it is required to estimate wear amount in accordance with the type of tier. Concretely, threshold K1 and K2, which estimate wear amount, are set according to the type of the tire or estimated wear amount is corrected by correction coefficient, which is set in accordance with the type of the tire in advance so that wear amount can be estimated in accordance with the type of the tire.

Example 1

The vehicle on which the apparatus for estimating wear amount as shown in the FIG. 1 is mounted was run on even asphalt road at 60 h/km. In that test, vehicle velocity V was detected by using position data from the GPS and wheel rotation velocity $V_{w0}$ was measured by using the wheel velocity sensor. A tire used in the test was 225/55R17 and vehicle velocity V and wheel rotation velocity $V_{w0}$ were detected with respect to each of wear at a new tire (wear amount is zero), wear in middle period (wear amount is middle) or wear in latter period (wear amount was great and rest of groove is 2 mm).

Also, to consider inner pressure dependence, relation tire inner pressure and wheel rotation velocity of the new tire was examined within general inner pressure range (150, 200 and 250 kPa). The FIG. 3 shows the result. As understood in the graph, since wheel rotation velocity depends on inner pressure, it is effective to correct measured wheel rotation velocity by tire inner pressure.

According to the tire used in the test, correction formula with respect to 200 kPa being normal condition at the present was as follows.

$V_w$(correction value)=$V_{w0}$(measuring value)/(1.01−0.000057×pressure value [kPa])

Additionally, wheel rotation velocity of each of measure tire is corrected by the correction formula to obtain wheel rotation velocity correction value $V_w$. The table 1 indicates a result that velocity ratio $(V_w/V)$ of each of the tire, which is obtained from above wheel rotation velocity correction value $V_w$ and vehicle velocity V. Value of velocity ratio $(V_w/V)$ is represented by index value, as the case of wear at new tire is 1000. Also, regarding vehicle velocity V and wheel rotation velocity $V_w$, average value in 1.0 second was used.

As indicated in the table 1, velocity ratio $(V_w/V)$ is great as tire wear amount becomes great. And since there is intentional difference between velocity ratios of wear at new, wear in middle period and wear in latter period, velocity ratio $(V_w/V)$ is obtained so that degree of tire wear can be estimated accurately.

The preferred embodiment 2.

In the preferred embodiment 1, wear amount of the tire tread is estimated in accordance with vehicle velocity V and wheel rotation velocity $V_w$. However, instead of the GPS receiver and the vehicle velocity detection unit 15, the vehicle longitudinal acceleration measuring unit, which measures vehicle longitudinal acceleration, may be provided with the vehicle side and a calculating unit of calculating change amount of wheel rotation velocity that is measured by vehicle longitudinal acceleration measurement unit is provided. To obtain same effect, amount of tire wear may be estimated from measured vehicle longitudinal acceleration and calculated change amount of wheel rotation velocity. The FIG. 4 is a functional diagram indicating structure of the apparatus for estimating tire wear amount 20 according to the present preferred embodiment 2. In the FIG. 2, numeral 21 denotes the vehicle longitudinal acceleration measuring unit disposed on the vehicle side and detecting change of ground vehicle velocity, 22 denotes the wheel velocity sensor detecting wheel rotation velocity $V_{w0}$, 23 denotes the pressure sensor detecting pressure in the interior of the tire of the vehicle (hereinafter tire inner pressure), 24 denotes the wheel rotation velocity correcting unit of correcting wheel rotation velocity $V_{w0}$ detected by the wheel velocity sensor 22 in accordance with tire inner pressure detected by the pressure sensor 23, 25 denotes the wheel rotation acceleration calculating unit of calculating change amount of wheel rotation velocity $V_w$ corrected in the wheel rotation velocity correcting unit 24, 26 denotes the acceleration ratio calculating unit of calculating acceleration ratio $S=(a_w/a_x)$ that is ratio between vehicle longitudinal acceleration $a_x$ detected in the vehicle longitudinal acceleration measuring unit 21 and wheel rotation acceleration $a_w=(dV_w/dt)$ calculated in the wheel rotation acceleration calculating unit 25, 27 denotes the tire wear amount estimating unit of estimating wear amount of the tire from calculated acceleration ratio S and 28 denotes a warning unit of warning that tire wear progresses when estimated wear amount exceeds predetermined value. The arithmetic section 29 in the apparatus for estimating tire wear amount 20 is composed of the wheel rotation velocity correcting unit 24, the wheel rotation acceleration calculating unit 25, acceleration ratio calculating unit 26 and the tire wear amount estimating unit 27.

According to the embodiment, as shown in the FIG. 5, the vehicle longitudinal acceleration measuring unit and the arithmetic section 29 are disposed on the vehicle 1 side and the warning unit 28 is installed to display panel 2 that is attached in the front of the driver's seat. The wheel velocity sensor 22 is installed to the vicinity of a drive shaft as not shown, the pressure sensor 23 is provided in interior side of tire of the wheel as not shown.

As the vehicle longitudinal acceleration measuring unit, an acceleration sensor may be used. As the wheel velocity sensor, a closed magnetic circuit may be used. Also, other type sensor such as a bearing-integrated type sensor may be used. As the pressure sensor, it is preferred to use a radio inner pressure detection unit, which is type of attaching to the wheel or the tire inner face, since it is required to transmit data to the vehicle side (TPMS).

A method of estimating tire wear amount by using the apparatus for estimating tire wear amount 20 according to the present invention will be explained as follows.

Firstly, vehicle longitudinal acceleration $a_x$, which is changing amount of ground vehicle velocity, is measured by the vehicle longitudinal acceleration measurement unit 21 provided on the vehicle side, while wheel rotation velocity $V_{w0}$ is measured by the wheel velocity sensor 22. On the other hand, in the case of that tire inner pressure decreases, periphery of the tire tends to decrease also. Therefore, the pressure sensor 3 is mounted on the tire 3 to detect tire inner pressure, the wheel rotation velocity correction unit 24 is provided so as to correct measured wheel rotation velocity $V_{w0}$ in accordance with detected tire inner pressure. Hereinafter, corrected wheel rotation velocity is represented by $V_w$.

Additionally, wheel rotation acceleration $a_w=(dV_w/dt)$, which is changing amount of wheel rotation velocity $V_w$ corrected by the wheel rotation velocity correction unit 24, is calculated by the wheel rotation acceleration calculating unit 25 and acceleration ratio $S=(a_w/a_x)$, which is ratio of wheel rotation acceleration $a_w$ with respect to vehicle longitudinal acceleration $a_x$ detected in vehicle longitudinal acceleration measurement unit 21, is calculated.

In the tire wear amount estimation unit 27, ratio $(S/S_0)$ is obtained and wear amount of the tire is estimated in accordance with ratio $(S/S_0)$. When wear amount of the tire becomes great, $(S/S_0)$ becomes great. Therefore, for example, firstly, threshold M1 and M2 which is greater than 1, is set, wear amount of the tire (degree of wear) is estimated such that where $(S/S_0)<M1$, wear amount of the tire is small, where $M1 \leq (S/S_0)<M2$, wear amount of the tire is middle, or where $M2 \leq (S/S_0)$, wear amount of the tire is great.

When the tire wear amount estimation unit 27 estimates that wear amount of the tire is great, signal including that is input to the warning unit 28 to make the driver acknowledge that wear on the tire progresses by a LED for warning around installed to the display panel 2.

Since progress of tire wear causes a lack of groove depth, even when the depth of water is shallow, hydro-planning is occurred readily. So, before the tire falls in unsuitable condition, the warning unit 28 warns the diver about the tire condition so that the driver can operate suitably such as tire change. That is, safety of the vehicle can be improved.

According to the preferred embodiment 2, the vehicle longitudinal acceleration measurement unit 21 is arranged on the side of vehicle body, vehicle longitudinal acceleration $a_x$ is measured on vehicle body side, wheel rotation velocity $V_{w0}$ is measured by the wheel velocity sensor 22, it is transformed to wheel rotation velocity $V_w$ corrected in accordance with tire inner pressure detected by the pressure sensor 23, wheel rotation acceleration $a_w=(dV_w/dt)$, which is ratio with respect to change amount of wheel rotation velocity $V_w$, is calculated, acceleration ratio $S=(a_w/a_x)$, which is ratio of wheel rotation acceleration $a_w$ with respect to vehicle longitudinal acceleration $a_x$, is calculated and tire wear amount is estimated in accordance with acceleration ratio S so that wear amount on the tire tread portion can be estimated accuracy without processing the tire tread portion.

Also, in the preferred embodiment 2, wear amount is classified into 3 grades, which are large, middle and small, according to degree of wear amount. However, as threshold is one, degree of wear is classified into 2 grades and timing of tire change may be informed to the driver, when degree of tire wear becomes great.

Further, degree of wear may be classified in more detail. However, since purpose for inspecting tire wear is to enhance safety of vehicle running, as the embodiment, it is more utilitarian to classify 3 grades as degree of wear.

Since change of velocity ratio $R=(V_w/V)$ due to tire wear differs in accordance with a type of the tire (difference of outer diameter), needless to say, it is required to estimate wear amount in accordance with the type of tier. Concretely, threshold K1 and K2, which estimate wear amount, are set according to the type of the tire or estimated wear amount is corrected by correction coefficient, which is set in accordance with the type of the tire in advance so that wear amount can be estimated in accordance with the type of the tire.

Example 2

The vehicle on which the apparatus for estimating wear amount is mounted as shown in the embodiment 2 was run on even asphalt road at 60 h/km and then vehicle longitudinal acceleration $a_x$ and wheel rotation velocity $V_{w0}$ at 0.2 G of vehicle acceleration. A tire used in the test was 225/55R17 and vehicle velocity V and wheel rotation velocity $V_{w0}$ were detected with respect to each of wear at a new tire (wear amount is zero), wear in middle period (wear amount is middle) or wear in latter period (wear amount was great and rest of groove is 2 mm).

Also, to consider inner pressure dependence, relation tire inner pressure and wheel rotation velocity of the new tire was examined within general inner pressure range (150, 200 and 250 kPa). The FIG. 3 shows the result. As understood in the graph, since wheel rotation velocity depends on inner pressure, it is effective to correct measured wheel rotation velocity by tire inner pressure.

According to the tire used in the test, correction formula with respect to 200 kPa being normal condition at the present was as follows.

$$V_w(\text{correction value})=V_{w0}(\text{measuring value})/(1.01-0.000057 \times \text{pressure value [kPa]})$$

Wheel rotation velocity $V_{w0}$ of each of measure tire is corrected by the correction formula to obtain wheel rotation velocity correction value $V_w$, wheel rotation acceleration $a_x$ being changing amount of wheel rotation velocity correction value $V_w$ is calculated and acceleration ratio $(a_w/a_x)$ of each tire from wheel rotation acceleration $a_w$ and vehicle longitudinal acceleration $a_x$. The table 2 shows the result. Acceleration ratio $(a_w/a_x)$ is represented by index value, as the case of wear at new tire is 1000. Also, regarding vehicle longitudinal acceleration $a_w$ and wheel rotation acceleration $a_x$, average value in 0.5 second was used.

As indicated in the table 2, acceleration ratio $(a_w/a_x)$ becomes great as tire wear amount becomes great. Also, since there is intentional difference of acceleration ratio $(a_w/a_x)$ among wear at the new tire, wear in middle period and wear in latter period, degree of tire wear can be estimated accurately by obtaining acceleration ratio $(a_w/a_x)$.

As explained above, according to the present invention, amount of wear on the tire tread portion can be estimated accurately without processing the tire tread portion. Moreover, the warning unit or the like makes the driver acknowledge condition of the tire so that running safety can be improved.

TABLE 1

| | WEAR AT NEW TIRE | WEAR IN MIDDLE-PERIOD | WEAR IN LATTER-PERIOD |
|---|---|---|---|
| $V_w/V$ | 1000 | 1007 | 1010 |

TABLE 2

| | WEAR AT NEW TIRE | WEAR IN MIDDLE-PERIOD | WEAR IN LATTER-PERIOD |
|---|---|---|---|
| $a_w/a_x$ | 1000 | 1005 | 1011 |

The invention claimed is:

1. An apparatus for estimating tire wear amount comprising:
   a vehicle longitudinal acceleration measuring unit installed to a vehicle body side of a vehicle and measuring longitudinal acceleration of the driven vehicle;
   a wheel rotation velocity measuring unit of measuring rotation velocity of a wheel of the vehicle;
   a calculating unit of calculating changing amount of measured rotation velocity of the wheel based on rotation velocity of the wheel; and
   a wear amount estimating unit of estimating wear amount of the tire mounted on the vehicle from the measured longitudinal acceleration $a_x$ measured by the acceleration measuring unit and the calculated changing amount of wheel rotation velocity $V_{w0}$ calculated by the calculating unit for calculating the changing amount of measured rotation velocity of the wheel.

2. The apparatus for estimating tire wear amount according to claim 1 further comprising:
   a detecting unit of detecting inner pressure of the tire of the vehicle and;
   a correcting unit of correcting measured rotation velocity of the wheel in accordance with detected inner pressure.

3. The tire wear mount estimating apparatus according to claim 1 further comprising:
   a warning unit of warning when estimated wear amount of the tire exceeds predetermined value that is set in advance.

4. The vehicle comprising the tire wear amount estimating apparatus according to claim 1.

5. The apparatus for estimating tire wear amount according to claim 1, wherein a wheel rotation acceleration $a_w=(dV_{w0}/dt)$, which is a ratio with respect to the changing amount of wheel rotation velocity $V_{w0}$, is calculated and,
   an acceleration ratio $S=(a_w/a_x)$, which is ratio of wheel rotation acceleration $a_w$ with respect to the vehicle longitudinal acceleration $a_x$, is calculated and the tire wear amount is estimated in accordance with acceleration ratio S.

6. An apparatus for estimating tire wear amount comprising:
   a vehicle longitudinal acceleration measuring unit installed to a vehicle body side of a vehicle and measuring longitudinal acceleration of the driven vehicle;
   a wheel rotation velocity measuring unit of measuring rotation velocity of a wheel of the vehicle;
   a calculating unit for calculating a changing amount of measured rotation velocity of the wheel and;
   a wear amount estimating unit of estimating wear amount of the tire mounted on the vehicle from the measured longitudinal acceleration $a_x$ measured by the longitudinal acceleration measuring unit and the calculated changing amount of wheel rotation velocity $V_{w0}$ calculated by the calculating unit for calculating the changing amount of measured rotation velocity of the wheel,
   wherein a wheel rotation acceleration $a_w=(dV_{w0}/dt)$, which is a ratio with respect to the changing amount of wheel rotation velocity $V_{w0}$, is calculated and, an acceleration ratio $S=(a_w/a_x)$, which is ratio of wheel rotation acceleration $a_w$ with respect to the vehicle longitudinal acceleration $a_x$, is calculated and the tire wear amount is estimated in accordance with acceleration ratio S.

7. The apparatus for estimating tire wear amount according to claim 6 further comprising: a detecting unit of detecting inner pressure of the tire of the vehicle and;
   a correcting unit of correcting measured rotation velocity of the wheel in accordance with detected inner pressure.

8. The tire wear mount estimating apparatus according to claim 6 further comprising:
   a warning unit of warning when estimated wear amount of the tire exceeds predetermined value that is set in advance.

9. The vehicle comprising the tire wear amount estimating apparatus according to claim 6.

* * * * *